Aug. 9, 1966  J. W. COFFMAN  3,264,767
PIN REGISTRATION SYSTEM OF PRODUCING SLIDE TRANSPARENCIES
FOR OVERHEAD PROJECTION
Original Filed March 3, 1959  2 Sheets-Sheet 1
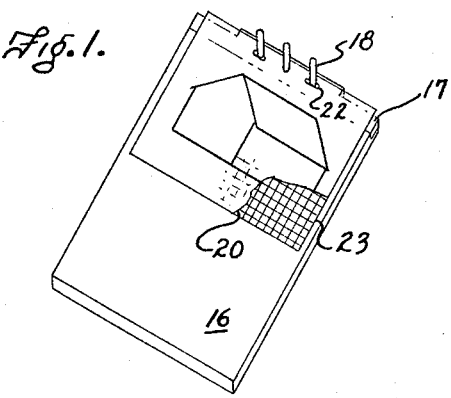
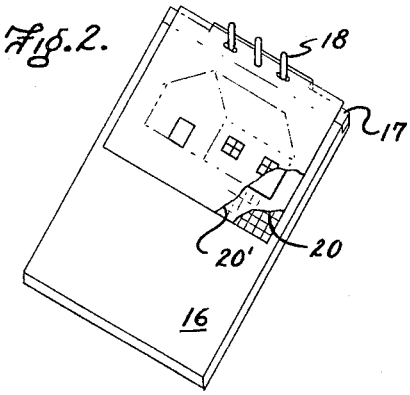
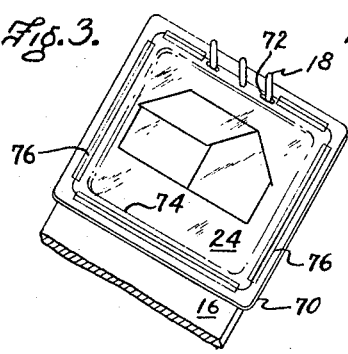
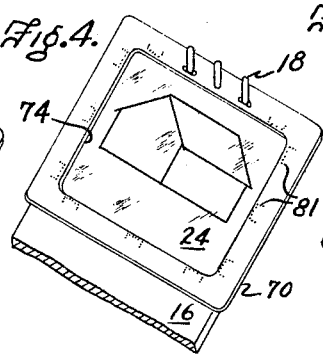
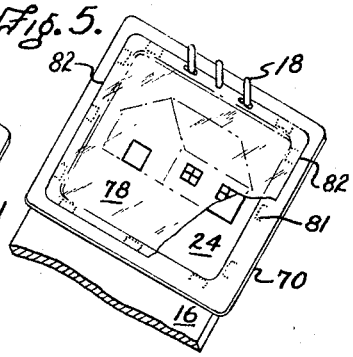
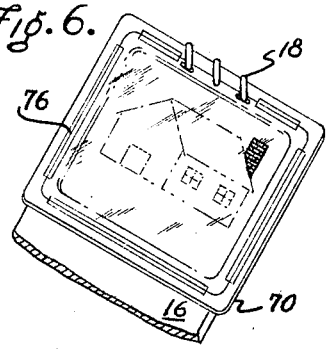
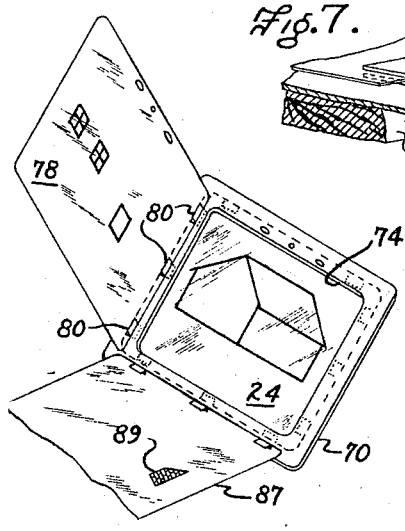
INVENTOR
JOE W. COFFMAN
BY Chapin & Neal
ATTORNEYS Aug. 9, 1966    J. W. COFFMAN    3,264,767
PIN REGISTRATION SYSTEM OF PRODUCING SLIDE TRANSPARENCIES
FOR OVERHEAD PROJECTION
Original Filed March 3, 1959    2 Sheets-Sheet 2
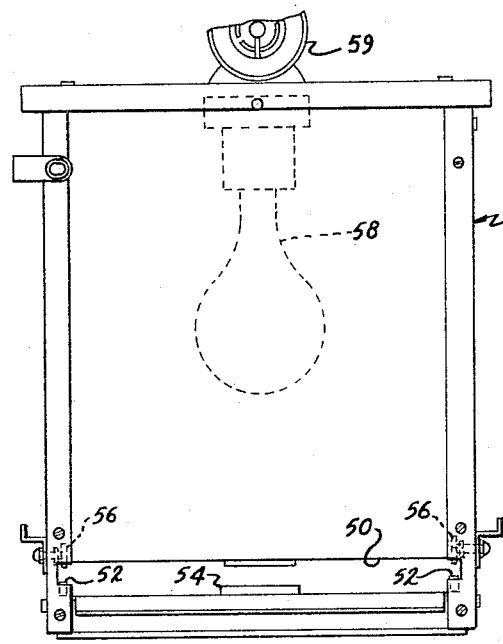
Fig.10.
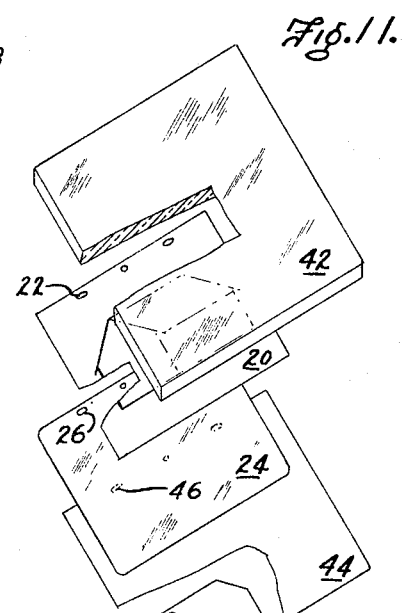
Fig.11.
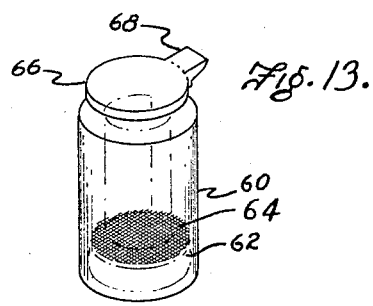
Fig.13.
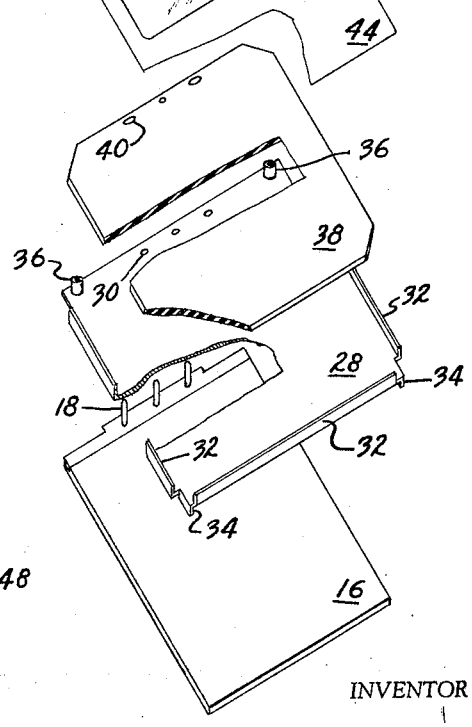
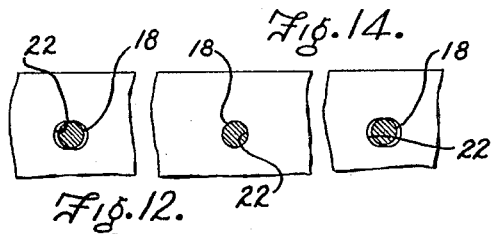
Fig.14.
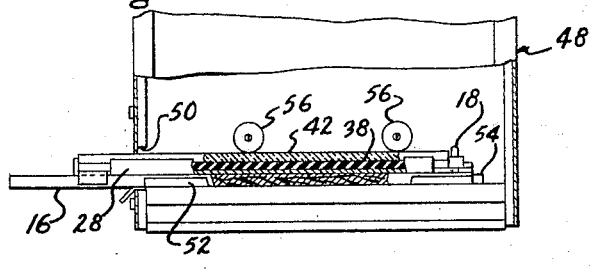
Fig.12.
INVENTOR
JOE W. COFFMAN
BY Chapin & Neal
ATTORNEYS

United States Patent Office 3,264,767
Patented August 9, 1966

3,264,767
PIN REGISTRATION SYSTEM OF PRODUCING SLIDE TRANSPARENCIES FOR OVERHEAD PROJECTION
Joe W. Coffman, Holyoke, Mass., assignor to Tecnifax Corporation, Holyoke, Mass., a corporation of Massachusetts
Continuation of application Ser. No. 796,978, Mar. 3, 1959. This application Jan. 29, 1964, Ser. No. 341,494
1 Claim. (Cl. 40—102)

This application is a continuation of my earlier application Serial No. 796,978, filed March 3, 1959, now abandoned. The invention relates to slide transparencies and in particular to a pin registration system for producing slide transparencies having a plurality of image bearing film sheets aranged in superposed relation and most commonly used in overhead projectors for visual communication work.

The field of visual communications is recognized today as a most effective means for transmitting ideas, especially with respect to matters of a generally technical nature. One recently available technique which has won wide acclaim in the field of visual communications is known as "overhead projection." As is well known in this art a projector placed close to an overhead screen may project a slide image on a screen behind an operator to enable him to talk to a group while facing his audience. The slides are of a size easily readable by the operator and he is thus able to communicate his ideas while in complete control of the projection of the slides, the sequence thereof, etc.

Such slides commonly comprise a plurality of multicolor transparency film sheets and either are all secured to a frame for a single picture image (known as a "static" slide) or are made up with an outline image and a plurality of hinged overlay film sheets, each of which may be of contrasting color and depict various portions of a composite image. Hinged overlays may be swung into or out of superposed relation with an outline print, for example, for selectively and progressively building up or breaking down components of a composite image in step-by-step fashion. Slides of this type are known as "dynamic slides." To be most effective from the standpoint of definition and clarity of image the overlays, whether fixed or hinged, must be accurately registered with each other and with the film bearing the outline image. Heretofore, the problem of accurate registrations has required painstaking care and relatively skillful preparation to insure good results.

A primary object of this invention is to provide an improved method or system for producing overlay slide transparencies of this type to enable a high degree of accuracy of registration with a plurality of superposed registered film sheets for either hinged or static overlay relationship.

A further object of the invention is to provide a system of producing such slides at a minimum of expense and in the making of which a minimum of skill and training is required on the part of the person practicing the method.

A still further object of the invention is to provide a pin registration system in which a single pin registration board is utilized at virtually every step in the process of making such slides so as to preserve an interrelated accuracy of registration of all the necessary components.

These and other objects and advantages of the invention will be better appreciated from a reading of the following description with reference to the accompanying drawings.

In the drawings:
FIGS. 1 and 2 are perspective views illustrating steps in preparing master sheets for doing the original art work;

FIGS. 3–7 are similar views to illustrate steps in assembling the finished slides after the transparency film sheets have been printed;
FIG. 8 is a fragmentary edge view showing a preferred method of hinging an overlay sheet to a frame;
FIG. 9 is a perspective view showing a finished slide having hinged overlays and illustrating the use thereof;
FIG. 10 is a front elevation of an exposure unit used in the printing step of the process;
FIG. 11 is an exploded view showing the various components of a "compression" assembly used for carrying out the printing operation;
FIG. 12 is a partial side elevational view of the unit of FIG. 10 with parts cut away and in section to show the assembly of FIG. 11 mounted in the printer;
FIG. 13 is a perspective view of a developing jar for film sheets exposed by the printer; and
FIG. 14 is a detail view showing the conformation of pin registration holes punched in the various sheets used in making the slides.

Referring to the drawings, it will be seen that a pin registration board 16 is utilized at each step in the preparation of the various sheets required to form a composite image, in the printing thereof (with the exception of the developing step), and in the necessary assembly and mounting steps to form the finished slide. The board 16 is seen in FIG. 1 and in the majority of the remaining views. It has a flat upper surface and three vertical pins 18 extending therefrom adjacent the upper edge. These pins are in spaced and transversely aligned relation and formed as shown by FIG. 14. Preferably the board is fitted with a metallic upper marginal edge as indicated at 17 from which pins 18 extend. The pins are aligned with extreme accuracy to receive the punched openings of the upper marginal edges of the various sheets to be mounted theeron as will appear.

As will be taken up in detail the board 16 is used in the preparation of master sheets (FIGS. 1 and 2); in the printing of the transparency film sheets from the master sheets (FIGS. 10, 11 and 12); in the mounting of the developed film sheets for registration on a frame (FIGS. 3–6); and in the hinging of overlay sheets on the frame (FIGS. 7 and 8). As will be realized, the master sheets are those sheets on which original art work is done or the desired image is otherwise originally prepared. From each master sheet a slide transparency film sheet receives its image printed thereon for incorporation in a finished slide.

In FIGS. 1 and 2 two master sheets are indicated at 20 and 20'. More sheets may, of course, be required for a particular slide but two will suffice for purposes of illustration. The master sheet are provided with openings or holes 22 for receiving pins 18 to register the working areas of the several sheets in superposed relation on the planar upper surface of the board. The master sheets are of a sufficiently transparent or translucent character so that an image appearing on a sheet disposed below the master sheet may be seen through it for tracing, copying and the like. The master sheets may be originally provided with holes 22 or they may be supplied without holes for punching by the use of a suitable portable punching instrument (not shown) such as will provide the proper location of the holes with respect to each other and the marginal edges of the sheet. As will be noted from the various figures the center hole fits snugly over the post 18 and the outside holes are elongated transversely of the sheet. More particularly as shown by FIG. 14 the outer holes are flatted at the top and bottom. This allows for lateral expansion or contraction of the sheets when mounted on the board without causing ripples or buckling of the sheets on the flat surface of the board. Thus each sheet can be held in flat contact on the board while performing the work required to produce the desired opaque image.

Thus, a first master sheet 20 as in FIG. 1 may be placed on board 16 with holes 22 receiving the upstanding pins 18 of the board. Portions of the sheet are then opaqued as by drawing lines on the sheet or by pasting opaque cutouts thereon. The desired image is drawn, or otherwise provided, directly to a size suitable for printing on the film sheets. For purposes of illustration, the outline of a house is shown on sheet 20. To assist in locating and obtaining proper proportions or dimensions, a grid sheet 23 may, if desired, be placed directly on the board 16 below the master sheet 20. The grid 23 may also include holes for registration by means of the pins 18 on the registration board. Then holes are punched in the same manner as the master sheets.

After completing an image on the first master sheet, other master sheets are then likewise prepared. While there is no set sequence for performing art work on such master sheets, there is shown for the purpose of simplification, the outline image opaqued on the first master sheet 20 and another portion or component of a composite image produced on the second sheet 20'. The second sheet is matched with this outline and the added portion is then opaqued on it. The second master sheet 20' (FIG. 2) is simply placed in registered superposed relation on the first sheet 20 by pinning it also to the board.

It will be noted, as seen in FIG. 2, that the working areas of the two sheets are automatically placed in registered position and additional image portions opaqued on the sheet 20'. These appear as the windows and door of the house, outlined on sheet 20. The process of preparing further image portions on succeeding master sheets may proceed in corresponding fashion to complete a desired composite image. This may be done either by placing additional sheets on top of the second master sheet or by sequentially placing each additional master sheet directly on top of the outline sheet 20. In any event it will be appreciated that the image portions prepared on the several master sheets may all be accurately registered with the outline of the first master sheet, the person preparing the same being able to achieve the desired accuracy simply by making certain that the sheets lie smoothly on the surface of the board as his work is done.

After preparation of any desired number of master sheets, the image portions opaqued thereon are reproduced on transparent film sheets. A film sheet is indicated at 24 in FIG. 11. The film sheets may be of the diazo type, each sheet being capable of reproducing an image in a distinctive color for forming with other sheets a multi-color transparency. The film sheets are provided with identically positioned holes or opening 26 to receive the upstanding pins 18 of the board 16 and so as to register the intended field of view or image receiving portions of the film sheet with the viewing area of the master sheets. As with the master sheets the film sheets may be supplied originally with registration holes or punched as required for use.

Referring to FIG. 11, the pin registration board 16 is used to register a master sheet 20 and a film sheet 24 in superposed relation for the printing operation. For this operation the pin registration board is fitted with a tray member 28 which includes pin registration openings 30 to fit over pins 18 of the board. The tray also includes wall portions 32 which extend upwardly from the side and lower edges. Tabs 34 extend downwardly from the side edge portions of the tray member and adjacent the lower edge thereof. The tabs engage the side edges of board 16, when the tray is mounted on the board, and together with the pins 18 prevent transverse shifting of the tray and the board. Bumper posts 36 preferably of rubberized material extend upwardly from the upper surface of the tray and adjacent the upper edge thereof. After mounting the tray on the board 16, a resilient pad 38 is placed on top of the tray. The pad has openings 40 to register with pins 18 and is of a size to be snugly received within the wall portions 32 of the tray 28. Portions 32 and pins 18 thus hold the pad 38 in a relatively fixed position and against any tendency to slide thereon. The board 16, tray 28, and pad 38 form in effect a lower platen for a "compression" assembly, the upper platen of which is a transparent plate member 42.

The plate 42 is plate glass material of a type to pass ultra-violet light. It overlies the master and film sheets. Plate 42 is positioned with its upper edge abutting the bumper elements 36, and its side and lower edges being disposed within and contiguous with the upstanding wall portions 32 of the tray. Bumpers 36 prevent the upper edge of the glass plate 42 from being chipped by contact with pins 18. The film sheet 24 (with its sensitized side facing upwardly) and master sheet 20 (overlying sheet 24) are sandwiched between the lower platen and the glass plate 42 in registered superposed relation by reason again of the holes 22 and 26 of the sheets positioned on pins 18. The pins 18 extend at least as high as the under surface of the glass plate. In addition a reflective backing or interleaf sheet 44 may also be placed on the upper surface of the resilient pad 38 before positioning the sheets and glass plate. The interleaf 44 may also be provided with openings 46 for receiving the registration pins of the board. With these elements thus arranged, the compression assembly as indicated by FIG. 12 may then be slid into a photographic printing device such as the exposure unit 48.

The exposure unit as printer 48 is a box enclosure having a horizontally disposed slot or feed opening 50 of sufficient size for receiving the compression assembly as described. Guide bars 52 (see FIG. 10) extending inwardly at opposite edges of the opening are provided to register the compression assembly within the exposure chamber. The printer further includes means for squeezing down on and compressing the resilient pad 38. This is in the form of hold down bearings 56 located in the exposure chamber and spaced upwardly above bars 52. The hold down bearings are preferably in the form of rollers for easy insertion of the compression assembly into the printer and its removal therefrom. On inserting the assembly, bearings 56 engage the upper surface of plate 42 at it marginal edges and the bearings 56 being vertically positioned force the plate 42 downwardly and thus compress pad 38. This urges and maintains the master sheet 20 and film sheet 24 in a flat surface-to-surface contact for an efficient photographic reproduction. Within the exposure chamber, the film is exposed to a source of illumination comprising as shown a photo flood lamp 58 designed to give off a high percentage of ultra-violet light.

A timer as at 59 may be used to automatically control the exposure time for a particular film, the type of film used, its color characteristics, and the degree of transparency of the master sheet determining the proper length of time for exposure. When exposed, the compression assembly may be drawn outwardly from slot 50 by sliding action.

Using diazo-type sensitized film, the areas of the film which are not masked by the opaqued lines of the master sheet will be "burned out" by the ultra-violet light emitted by flood lamp 58. After removing the compression assembly from the printer 48 the exposed film sheet 24 is then immediately removed for developing in ammonia fumes.

One type of developing tank which may be used for this purpose is shown in FIG. 13 and comprises a transparent glass jar 60 having an ammonia impregnated sponge 62 resting on the bottom of the jar and over it a guard or spacer 64 in the form of a rubber screen to prevent direct contact of the film sheet with liquid ammonia on the sponge. The developer jar 60 also includes a cover 66 which may be pivotally opened and closed by an outwardly extending lever at 68. The progress of development may be observed through the walls of the jar due to its transparent character and when the image is developed to sufficient intensity, the sheet may be removed.

The same process of printing and developing is repeated for each master sheet bearing its previously opaqued image portion. As described above a film sheet of different color-reproducing qualities may be used for each master sheet. The developed sheets are then assembled on a mounting frame 70 (FIGS. 3–9).

The mounting frame 70 is formed of a relatively stiff or rigid material such as cardboard and includes at its upper edge three holes 72 positioned and spaced for receiving the pins 18 of board 16. As previously related these holes may be provided in the manufacturing process or punched by using a hole punch. The holes are disposed so that a rectangular opening defined by the inner edge at 74 of the frame is positioned on the working surface of the board 16 and provides the intended field of view. The image bearing portion of the film sheet is thus registered in the opening. In addition, the frame side edges extend outwardly of the sides of the board as will be later explained.

With frame 70 placed face downwardly on the board as shown by FIG. 3 the developed film sheet 24 bearing the background or outline image of a composite view, as the house outline, is placed over the frame, sensitized face down, and with its holes also pinned on the board. This outline film sheet is then secured to the frame by means of pressure sensitive adhesive strips along the marginal edges as at 76. This secures the base outline at the underside of the frame although it will be understood as a matter of choice that this film might also be located at the front side of the frame. In the example shown the frame is then turned over to lie, front face up, on the board as shown by FIG. 4, the sensitized face of the sheet 24 facing upwardly. A second developed film sheet or transparency 78 is then pinned on the board. The image portion of sheet 78 (FIG. 5) is thus registered in superposed relation with the outline image of the first sheet 24. The transparency 78 as will be realized was reproduced from the master sheet 20' and thus includes the windows and a door of the house to be completely projected. At this point a comparison of FIGS. 2 and 5 will show that the images of the transparencies (FIG. 5) are exactly registered in the same manner as the opaqued images of the master sheets from which they were reproduced (FIG. 2).

For a hinged overlay or "dynamic" slide the film sheet 78, pinned and registered on the board as in FIG. 5, is then secured to the frame by a pair of strips or tabs of sheet material indicated at 80 (FIGS. 7, 8, 9). The tabs are fastened along one edge only of the overlay sheet 78 at spaced locations. These locations at which the tabs may be most advantageously fastened are conveniently indicated by template markings as at 81 on the upper surface of frame 70. The tabs 80 are coated with a pressure sensitive adhesive on one surface of the strips from which they are made. As will be appreciated from the drawing each strip is folded to bring the adhesive surfaces into contact with opposing upper and lower surface portions of the film sheet 78. In practice one free end of a strip may be laid on the frame surface within the outline of the template marking 81 and the edge of the sheet 78 then brought down on it. Next the other strip end may be folded over for adhering to the opposing upper surface of the sheet margin.

The bight portion of the strip thus extends outwardly of the edge 82 of sheet 78. The strip material is preferably extremely thin so as to lie substantially in the plane of the film sheet. The step of securing such tabs to each overlay film sheet is repeated for the number of overlays made for a given slide. The tabs may be secured to all such overlays in corresponding template locations or the hinged sheet sides may be otherwise selected. As will be seen in FIG. 5 and FIG. 9, the template markings are provided on all four frame edges. The outwardly extending bight portions of the strips in any event are then secured to the frame 70 by means of staples indicated at 84.

The tabs 80 are, of course, individually applied to each sheet as the overlay sheets are kept in registered, correctly super-imposed relation on the pin registration board. One such overlay sheet 78 is shown in FIGS. 5 and 7, but it will be realized that a plurality of such overlay sheets 78 may obviously be likewise registered on the board and that tabs 80 may be affixed at the same locations on each of the sheets using the template 81 in each case or the outline of a previously affixed tab 80. In any event one staple 84 may obviously be adapted to secure a plurality of superimposed tabs registering with each other above a single template marking. Thus a plurality of overlay sheets may be hinged along the same side edge. Alternatively, as indicated by FIG. 9, the hinged sides may be variously chosen. The order in which the overlays are intended for viewing will dictate to a large degree the manner and order of affixing the same.

The staples when applied are most advantageously secured accurately at the very edge of the sheet 78 as indicated in FIG. 8. When the finished slide unit is removed from the pin registration board the overlay sheets will thus be hinged to rest in accurately superimposed registration with the outline sheet 24 and with other overlays 78.

For stapling the tabs 80, a specially dimensioned stapler jaw arrangement is provided as indicated in FIG. 8. With the overlay (or overlays) in registered relation on the frame and board 16, the lower jaw of the stapler 86 is designed to slide under the edge of frame 70 and to abut the side edge of board 16. The operator need only "sight" the upper jaw to center it over the tab 80. Assuming one or more sheets 78 are held flatly on the registration board the anvil portion of the jaw will then underlie the edge of the sheets 78 so as to receive the prongs of the staple at the sheet edge. The staple 84 is thus positioned contiguously with the side edge 82 of the overlay transparency sheet 78. When stapled the overlays are hinged to frame 70 for swinging into and out of superposed registration with the outline sheet and each other.

In the drawings FIGS. 5, 7, and 8 show a single overlay sheet 78. As previously mentioned it is common to make a plurality of overlays hinged to frame 70. In FIG. 9 a "dynamic" slide is illustrated with two overlay sheets. In this example one of the sheets is hinged by tabs along one side and the second (sheet 87 showing a chimney 89 of the house) hinged by tabs along the bottom edge. As is well recognized in the art this type of variation as well as hinging additional sheets at the top or other side are matters of choice.

The hinge tabs 80 as mentioned above are extremely thin strips of adhesively coated material. As a particular feature for making up slides accurately and for producing a long lasting hinge which may be used most advantageously, a polyester film material is preferred. As sold under the trade name "Mylar" this type of film has been found to be characterized by exceptional strength for hinging purposes in this environment and to have an exceptionally trouble-free life over long periods of use. Another outstanding advantage is the availability of "Mylar" in thicknesses from .00025″ to .0075″ so that a great number of overlay sheets can be employed without being limited by reason of a bulky hinge construction.

Referring now to FIG. 6 there is illustrated a "static" slide the film sheets being secured in fixed relation to frame 70. In this case the outline bearing transparency sheet 24 and overlay transparency sheets are taped while the frame and sheets are registered on the board 16 by the pins 18 and in a manner comparable to that described in connection with FIG. 5. The "static" slide employing overlay sheets is generally used for multi-color reproductions and with "static" slides no hinge template markings are necessary.

While the present slide producing process or system may be used with many types of film, its greatest benefits are realized in using sensitized film sheets having different color reproducing qualities. Thus the outline of a composite image may be produced in brown or black and the other image portions each of a different color. For example, in conjunction with the image described, the house outline printed on the film transparency 24 may be brown, the windows and door or overlay 78 may be green and the chimney on the overlay 87 may be red. Upon projecting slides of this character, in building up the image in step-by-step fashion, a strong visual impact is created for the viewers. It has been found that this impact is enhanced by clear, vivid and accurately registered overlays. The use of this integrated system results in the production of slides of uniformly excellent character and at relatively low costs.

Having thus described this invention, what is claimed is:

Slides for overhead projectors comprising a mounting frame, one film transparency mounted in fixed coplanar relation on said frame and having a portion of a composite projection image, and a plurality of other film transparencies swingably affixed along different edges of said frame to enable variable sequence of overlay projection and each bearing at least another portion of said composite image, said frame and transparencies having three registration holes disposed parallel to one edge thereof, the center one of said holes being round and the others being elongated in the direction of hole alignment enabling expansion and contraction of the transparencies when disposed on a pin registration board, each of said other film transparencies being affixed to said frame by at least one flexible tab.

References Cited by the Examiner
UNITED STATES PATENTS

| | | | |
|---|---|---|---|
| 1,715,127 | 5/1929 | Goldman | 352—87 |
| 2,260,092 | 10/1941 | Pickley | 352—50 |
| 2,837,853 | 6/1958 | Bing | 40—152 |
| 2,984,034 | 5/1961 | Perrot | 40—152 |
| 3,071,464 | 1/1963 | Cholkley | 96—27 |
| 3,096,176 | 7/1963 | Craig | 96—27 |

FOREIGN PATENTS 421,132  12/1934  Great Britain.

References Cited by the Applicant
FOREIGN PATENTS

| | | |
|---|---|---|
| 791,351 | 1/1960 | Canada. |
| 1,250,837 | 2/1960 | France. |
| 1,121,837 | 2/1960 | Germany. |
| 884,692 | 1/1960 | Great Britain. |
| 248,610 | 2/1960 | Holland. |
| 624,333 | 2/1960 | Italy. |
| 6,615 | 3/1960 | Japan. |
| 1,558 | 2/1960 | Sweden. |
| 2,199 | 2/1960 | Switzerland. |

EUGENE R. CAPOZIO, *Primary Examiner.*

ALVIN E. TANENHOLTZ, *Examiner.*

WENCELSO J. CONTRERAS, *Assistant Examiner.*